Patented Nov. 16, 1948

2,454,250

UNITED STATES PATENT OFFICE 2,454,250

MOLDING COMPOSITION OF POLYVINYL AROMATIC COMPOUND

Lawrence M. Debing, Springfield, Mass., assignor to Monsanto Chemical Company, St. Louis, Mo., a corporation of Delaware No Drawing. Application October 27, 1945, Serial No. 625,103

4 Claims. (Cl. 260—45.2)

This invention relates to polymeric vinyl aromatic compositions. More particularly the invention relates to fillers for polymerized vinyl aromatic resins.

Fillers are incorporated in polymerized vinyl aromatic compounds to raise their heat resistance and increase their toughness. Well known fillers fail in many respects to provide useful compositions. Many of them impart undesired color, others markedly decrease the water absorption and still others can be used only in limited amounts due to their tendency to "crock" or migrate to the surface of the finished article. A further cause for failure of most well known fillers is their electrical conductivity which seriously impairs the dielectric qualities of polymerized vinyl aromatic compounds.

It is an object of this invention to provide a filler for polymerized vinyl aromatic compounds.

A further object is to provide a filler for polymerized vinyl aromatic compounds which increases the heat resistance of the vinyl polymer resin.

Another object is to provide a filled polymerized vinyl aromatic resin composition having superior dielectric properties.

Still another object is to provide a filled polystyrene resin composition having superior dielectric properties which can be molded by conventional means.

These and other objects are obtained by incorporating in polymerized vinyl aromatic compounds a filler comprising an insoluble, infusible reaction product of an aldehyde and an aminotriazine which is incompatible with the polymerized vinyl aromatic compound.

The following examples are given in illustration and are not intended to limit the scope of this invention. Where parts are mentioned they are parts by weight.

Example I

| | Parts |
|---|---|
| Polystyrene | 100 |
| Resinified trimethylol melamine powder | 100 |

The styrene and melamine resins were blended on hot malaxating rolls and the resulting composition then ground to form a molding powder. This powder was molded into a bar ½" x ½" x 4" by conventional compression molding methods. The heat distortion temperature of the molded bar was 90° C. as compared with unfilled polystyrene which has a heat distortion temperature of 78° C. When heated at 130° C. for 16 hours the molded bar showed only a 1% change in dimensions whereas unfilled polystyrene and polystyrene filled with a mixture of powdered quartz and decachlordiphenyl unmolded to such a degree that the dimensional change could not be adequately measured. The high frequency electrical loss factor of the molded styrene-melamine composition was .016 at 1 megacycle.

Example II

| | Parts |
|---|---|
| Polystyrene | 100 |
| Resinified trimethylol melamine powder | 300 |

The styrene and melamine resins were blended in a heated Banbury mixer and the mix was then calendered into sheets which were ground into powder form for molding purposes. A ½" x ½" x 4" bar was compression molded from the powder. The bar had a heat distortion temperature of 100° C. and even at 130° C. showed only slight dimensional change.

Example III

| | Parts |
|---|---|
| Polystyrene | 100 |
| Resinified hexamethylol melamine powder | 100 |

The styrene and melamine resins were blended on hot malaxating rolls and then ground to form a molding powder. A ½" x ½" x 4" bar, compression molded from the powder, showed a heat distortion temperature of 95° C. and was substantially unaffected by heating at 130° C.

The composition shown in the examples are thermoplastic, can be molded by other methods than compression molding such as injection molding, transfer molding, etc., and do not become infusible under the molding conditions.

Objects molded from the compositions are opaque and may have a distinct mottle if contrasting coloring materials are used in the resins components.

In comparison with the polystyrene-melamine resin, composition, a polystyrene-aldehyde-phenol composition containing 100 parts of polystyrene and 200 parts of an insoluble, infusible, formaldehyde-phenol condensation products showed a dimensional change of over 1.5% in the heat treatment at 130° C. and had an electrical loss factor of 0.035 at 1 megacycle.

The polystyrene shown in the examples may be replaced in whole or in part by its homologs and derivatives and other vinyl aromatic resins. Among the resins which may be used are the alkyl styrenes such as ring substituted methyl, ethyl, dimethyl diethyl styrenes, halogenated styrenes such a p-chloro styrene, 2,4-dichloro styrene, 2,5-dichloro styrene, vinyl naphthalene, etc. Mixtures of the above named resins may be used.

The trimethylol melamine resin of the examples was made by reacting 1 mol of melamine with 3 mols of formaldehyde and polymerizing the product to the insoluble and infusible form by heating in the presence of an acid catalyst. The hexamethylol melamine resin was made in the same way using a melamine-formaldehyde ratio of 1 mol to 6 mols.

The methylol melamine shown in the examples may be replaced in whole or in part by melamine modified with other aldehydes such as acetaldehyde, propionaldehyde, butyraldehyde, octaldehyde, etc. or by the reaction products of aldehydes with other aminotriazines such as 2,4-diamino-1,3,5-triazine, ammeline, melam, 2-chloro-4,6-diamino-1,3,5-triazine, 2,4,6-trihydrazino-1,3,5-triazine, 6-methyl-2,4-diamino-1,3,5-triazine, 2,4,6-triethyl triamino-1,3,5-triazine, 2,4,6-triphenyl triamino-1,3,5-triazine, etc. The molar ratio of aminotriazine to aldehyde may vary from 1:1 to 1:6. After reaction with the aldehyde the aminotriazine is then cured by heat with or without a catalyst to form an insoluble, infusible resin which is the filler used according to this invention.

The ratio of aminotriazine resin to vinyl aromatic resin on a weight basis may be varied between 0.5 to 1 and 5 to 1. Such variations in ratio will be determined by the qualities desired in the finished product.

Other conventional additives may be used to modify the compositions of this invention such as lubricants, pigments, dyes, etc.

Strictly speaking fully cured aminotriazine resins are not compatible with the polymerized vinyl aromatic compounds and should, by all known rules, migrate to the surface of the molded objects causing a bloom and "crocking." Surprisingly enough it was discovered that no such migration and "crocking" occurred even after extended storage.

This invention makes it possible to use a high proportion of filler to a vinyl aromatic resin obtaining thereby a readily moldable thermoplastic composition having excellent electrical insulating properties and having a greatly increased heat resistance compared to the unmodified vinyl aromatic resin and vinyl aromatic resins filled with such heat resistant materials as powdered quartz.

The foregoing description is given in illustration and is not intended to limit this invention as set forth in the appended claims.

What is claimed is:

1. A molding powder comprising one part of a solid polymer consisting of a polymerized vinyl aromatic compound taken from the group consisting of styrene, ring-substituted alkyl styrenes, ring-substituted chlorostyrenes and vinyl naphthalene, blended with from ½ to 5 parts of a pulverulent, incompatible, infusible, insoluble aldehyde-aminotriazine resin, said molding powder being capable of being molded under heat and pressure.

2. A molding powder as in claim 1 wherein the aminotriazine is melamine.

3. A molding powder as in claim 1 wherein the vinyl aromatic polymer is polystyrene.

4. A molding powder as in claim 1 wherein the vinyl aromatic polymer is polystyrene and the aminotriazine is melamine.

LAWRENCE M. DEBING.

REFERENCES CITED

The following references are of record in the file of this patent:

UNITED STATES PATENTS

| Number | Name | Date |
|---|---|---|
| 2,325,987 | Swain | Aug. 3, 1943 |
| 2,353,995 | Conner | July 18, 1944 |

OTHER REFERENCES

Powers, "Synthetic Resins and Rubbers," pages 92 and 93, pub. 1943 by John Wiley and Sons, Inc., N. Y.